US006410173B1

(12) United States Patent
Arfsten et al.

(10) Patent No.: US 6,410,173 B1
(45) Date of Patent: Jun. 25, 2002

(54) ANTIREFLECTION COATINGS AND OTHER MULTILAYER OPTICAL COATINGS FOR HEAT-TREATABLE INORGANIC SUBSTRATES AND METHODS FOR MAKING SAME

(75) Inventors: Nanning J. Arfsten; Axel Reich, both of Moorestown; Frank Rodriguez, Maple Shade; James F. Gavlas, Mercerville, all of NJ (US)

(73) Assignee: Denglas Technologies, LLC, Moorestown, NJ (US)

( * ) Notice: Subject to any disclaimer, the term of this patent is extended or adjusted under 35 U.S.C. 154(b) by 0 days.

(21) Appl. No.: 09/201,599

(22) Filed: Nov. 30, 1998

(51) Int. Cl.⁷ ................................................. B32B 9/00
(52) U.S. Cl. ..................... 428/701; 428/702; 428/697; 428/699; 428/428; 428/432; 428/216; 428/212; 351/166
(58) Field of Search ............................... 428/432, 428, 428/426, 688, 689, 697, 699, 701, 702, 212, 216; 351/166

(56) References Cited

U.S. PATENT DOCUMENTS

| 3,078,693 A | 2/1963 | Lytle |
| 3,305,336 A | 2/1967 | Browne et al. |
| 3,415,677 A | 12/1968 | Moser et al. |
| 3,934,961 A * | 1/1976 | Itoh et al. |

(List continued on next page.)

FOREIGN PATENT DOCUMENTS

| EP | 0 436 741 A1 | 7/1991 |
| EP | 0 515 847 A2+ A3 | 12/1992 |
| EP | 0 586 050 A1 | 3/1994 |
| EP | 0 942 316 A2 | 9/1999 |
| EP | 0 953 550 A1 | 11/1999 |
| EP | 0 728 712 B1 | 4/2000 |
| FR | 2 730 990 | 8/1996 |
| JP | 58-011772 A | 1/1983 |
| JP | 61-189501 A | 8/1986 |
| SU | 823331 B | 4/1981 |

OTHER PUBLICATIONS

H. Schroeder, "Oxide Layers Deposited from Organic Solutions", pp. 87–141, (1969) No month.
N. Özer, et al., "Preparation and Properties of Spin–coated $Nb_2O_5$ Films by the Sol–gel Process for Electrochromic applications", Thin Solid Films, vol. 277, pp. 162–168, (1996) No month.
S. Parraud, et al., "Stabilization and Characterization of Nanosized Niobium and Tantalum Oxide Sols—Optical Applications for High–Power Lasers", J. Am. Ceram. Soc., vol. 75, No. 8, pp. 2289–2292, (1992) No month.

(List continued on next page.)

Primary Examiner—Deborah Jones
Assistant Examiner—Wendy Boss
(74) Attorney, Agent, or Firm—Akin, Gump. Strauss, Hauer & Feld, L.L.P.

(57) ABSTRACT

The invention includes a bilayer antireflection coating, multilayer antireflection coatings, and a method for making a multilayer antireflective coated substrate. The bilayer and multilayer coatings include layers having metallic oxides, at least one layer in each of such coatings having as a material with an index of refraction at least about 1.90, a layer comprising oxides of zirconium such that when subjected to heat treatments, such as tempering, the coatings substantially retain their optical properties. The coatings further include layers having materials of low index of refraction which include oxides of aluminum which provide coating stability and increased coating solution storage life. In the method, the layers are applied by successive dip coating techniques using solvent-based solutions and the resulting coatings can be used to coat large sized substrates which can be later cut, trimmed and/or otherwise shaped and later heat treated with substantial retention of optical properties.

16 Claims, 2 Drawing Sheets

U.S. PATENT DOCUMENTS

| | | | |
|---|---|---|---|
| 4,240,816 A | | 12/1980 | McMaster et al. |
| 4,260,222 A | | 4/1981 | Kozawa |
| 4,271,210 A | | 6/1981 | Yoldas |
| 4,806,220 A | | 2/1989 | Finley |
| 5,028,759 A | | 7/1991 | Finley |
| 5,059,295 A | | 10/1991 | Finley |
| 5,089,743 A | | 2/1992 | Okuda et al. |
| 5,254,392 A | * | 10/1993 | Burns et al. |
| 5,362,552 A | | 11/1994 | Austin |
| 5,372,874 A | | 12/1994 | Dickey et al. |
| 5,399,435 A | * | 3/1995 | Ando et al. |
| 5,450,238 A | | 9/1995 | Bjornard et al. |
| 5,460,888 A | | 10/1995 | Hashimoto et al. |
| 5,552,180 A | | 9/1996 | Finley et al. |
| 5,563,734 A | | 10/1996 | Wolfe et al. |
| 5,728,456 A | | 3/1998 | Adair et al. |
| 6,068,914 A | * | 5/2000 | Boire et al. |
| 6,074,730 A | * | 6/2000 | Laird et al. |

OTHER PUBLICATIONS

R. Sempere, et al., "$SiO_2$–$Nb_2O_5$ Thin Films Using Sol–gel Technology" *J. Non–Crystalline Solids*, vol. 147 & 148, pp. 499–502, (1992) No month.

N. Özer, et al., "Optical and Electrochemical Characteristics of Niobium Oxide Films Prepared by Sol–gel Process and Magnetron Sputtering A Comparison", *Solar Energy Materials and Solar Cells*, vol. 40, pp. 285–296, (1996) No month.

G.R. Lee, et al., "Electrochromic $Nb_2O_5$ and $Nb_2O_5$/Silicone Composite Thin Films Prepared by Sol–Gel Processing", *J. Mater. Chem.*, vol. 1(3), pp. 381–386, (1991) No month.

P. Greismar, et al., "Sol–Gel Route to Niobium Pentoxide", *Chem. Mater.* vol. 3, pp. 335–339, (1991) No month.

B. Ohtani, et al., "Electrochromism of Niobium Oxide Thin Films Prepared by the Sol–Gel Process", *J. Electrochem. Soc.*, vol. 141, No. 9, pp. 2439–2442, (1994) No month.

R. Herrmann, "Quarterwave Layers: Simulation by Three Thin Layers of Two Materials", *Applied Optics*, vol. 24, No. 8, pp. 1183–1188, (1985) No month.

* cited by examiner

ANTIREFLECTION COATINGS AND OTHER MULTILAYER OPTICAL COATINGS FOR HEAT-TREATABLE INORGANIC SUBSTRATES AND METHODS FOR MAKING SAME

BACKGROUND OF THE INVENTION

Antireflection coatings are used for a variety of substrates, particularly glass. Broad band antireflection coatings are typically designed to minimize reflection throughout the visible range of the spectrum. There are many ways to apply such coatings to glass, including dip coating using sol gel techniques and more costly vacuum techniques such as sputtering.

Safety glass for automobiles, picture frames, display cases and the like is typically formed by subjecting cut or shaped glass to a high temperature heat treatment, followed by rapid cooling. The process induces stress in the glass which thereby contributes to enhancing the mechanical stability of the glass forming safety glass. Such glass, due to its enhanced properties, cannot be cut, trimmed or otherwise mechanically treated after tempering. As such, glass substrates are cut, shaped and/or trimmed prior to tempering.

It is advantageous in safety glass manufacture to provide coatings to minimize glare and the like. However, many difficulties are encountered in applying antireflection or other optical coatings to glass which is to be tempered. In the prior art, such coatings cannot be practically applied prior to tempering because the tempering process creates disadvantages with respect to resulting optical properties. During tempering, thinning of the coating layers occurs, typically with respect to the outer layer of a multilayer antireflection coating. The outer layer may be burned off and/or the entire coating system distorted. Further, the index of refraction may be affected due to changes in the crystal structure or density changes of some materials during tempering. Such changes affect the optical properties of the whole system. Titanium dioxides, which are commonly used as a middle layer in three layer antireflection coatings, are significantly affected by tempering.

In addition to the above-noted problems, the quick cooling used in the tempering process which induces the desired stress within the glass, unfortunately also induces undesirable stress into the antireflection or other optical coating subjected to tempering. The stress in the coating, however, is not beneficial and often leads to disintegration, cracks or microcracks. The coating will appear hazy as a result, or may be completely destroyed such that it cracks or flakes off.

Because of the disadvantageous results of tempering coated glass, antireflection coatings have been applied using various coating techniques after the glass has been tempered. Unfortunately, this means that large pieces of commercial glass must first be cut and shaped, then tempered. As a result, coating is done on smaller, pre-cut pieces of tempered glass. This process is time-consuming, inefficient, and, therefore, tends to be uneconomical.

In attempting to coat already cut tempered glass with antireflection coatings, sophisticated vacuum coating techniques are typically required, because practical dip-coating techniques used for standard antireflection coated glass have not been used successfully in the art of making tempered glass. Application of an antireflection coating using dip coating techniques involves heat treatments to form the coatings which cause relief in the stress created by tempering the glass. Relief of the stress resulting from tempering contributes to deteriorating the mechanical properties provided by tempering. While there has been an attempt to form tempered glass using dip coating which involves estimating the changes in optical properties and trying to compensate for them prior to heat treatment, such methods lack sufficient quality control and do not maintain adequate reflection color. As such, dip coating, while cost effective and practical for use in coating standard glass, has not been practically and effectively used for coating tempered glass or other heat treated inorganic substrates to provide coatings of adequate reflection color, and of reproducible optical quality.

As a result of the inability to use dip-coating techniques, it has been necessary to use techniques such as cathodic sputtering to apply antireflection coatings for tempered glass. Examples of such techniques are described in U.S. Pat. Nos. 5,059,295 and 5,028,759 of Finley.

While sputtering allows for application of antireflection coatings for making tempered glass, there is still a need in the art for an economical process for large scale formation of antireflection coated glass which can be cut and used to form tempered glass. There is further a need in the art for an economical method for coating glass prior to cutting and trimming for tempering such that larger pieces of glass may be coated while still providing tempered glass of optical quality.

BRIEF SUMMARY OF THE INVENTION

The invention includes a multilayer antireflection coating for use in coating a heat treatable inorganic substrate comprising an inner layer for contact with an inorganic substrate having at least two different metallic oxides and being capable of providing an index of refraction of from about 1.54 to about 1.90 after curing. The coating further includes a middle layer on the inner layer comprising an oxide of zirconium and being capable of providing an index of refraction of at least about 1.90 after curing and an outer layer on the middle layer comprising at least one metallic oxide and being capable of providing an index of refraction of about 1.54 or less after curing. The optical properties of the multilayer antireflection coating are substantially retained after the multilayer antireflection coating is applied to an inorganic substrate and subsequently subjected to a heat treatment The invention further includes a bilayer antireflection coating for use in coating a heat treatable inorganic substrate comprising an inner layer for contact with an inorganic substrate comprising an oxide of zirconium and at least one oxide of a metal different from zirconium, wherein the inner layer is capable of providing an index of refraction of from about 1.54 to about 1.90 after curing, and an outer layer on the inner layer having at least one metallic oxide and being capable of providing an index of refraction of about 1.54 or less after curing. The optical properties of the bilayer antireflection coating are substantially retained after the bilayer antireflection coating is applied to an inorganic substrate and subsequently subjected to a heat treatment.

Also within the invention is a multilayer antireflection coating for use in coating a heat treatable inorganic substrate comprising an inner layer comprising an oxide of zirconium and being capable of providing an index of refraction of at least about 1.90 after curing; a first middle layer on the inner layer having at least one metallic oxide and being capable of providing an index of refraction of about 1.54 or less after curing; a second middle layer on the first middle layer comprising an oxide of zirconium and being capable of providing an index of refraction of at least about 1.90 after curing; and (d) an outer layer on the second middle layer having at least one metallic oxide and being capable of providing an index of refraction of about 1.54 or less after curing. The optical properties of the multilayer antireflection coating are substantially retained after the multilayer antireflection coating is applied to an inorganic substrate and subsequently subjected to a heat treatment.

A method for making a heat treated antireflective coated inorganic substrate is also provided. The method comprises coating an inorganic substrate with an inner layer comprising a mixture of at least one first oxide of a metal selected from the group consisting of titanium, zirconium, lanthanum, tantalum, and niobium and at least one second oxide of a metal selected from the group consisting of silicon, and aluminum to form an inner layer. The inner layer is coated with a middle layer comprising an oxide of zirconium. The middle layer is coated with an outer layer of at least one oxide of a metal selected from the group consisting of silicon, and aluminum; and the coated inorganic substrate is heat treated.

DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings, like numerals are used to indicate like elements throughout. In the drawings.

DETAILED DESCRIPTION OF THE INVENTION

Figure 1:
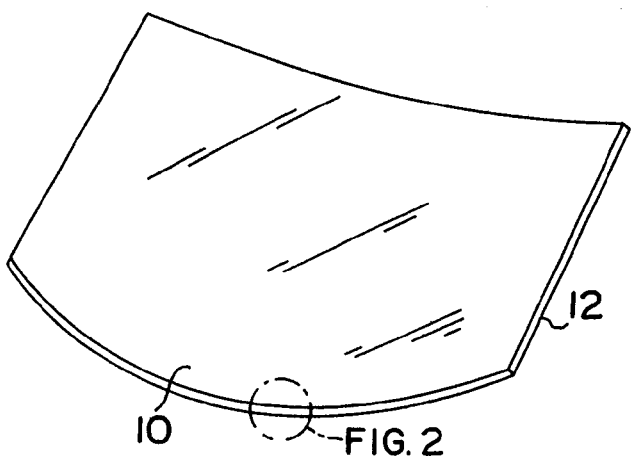
FIG. 1 is a perspective view of a shaped antireflection coated piece of safety glass formed according to one embodiment of the invention.

The present invention will now be described with respect to its preferred embodiments. The following description should not be considered limiting. Words such as "left" and "right," "upper" and "lower" and "inner" and "outer" designate directions in the drawings to which reference is made. The terminology includes the words above specifically mentioned, derivatives thereof and words of similar import.

Figure 2:
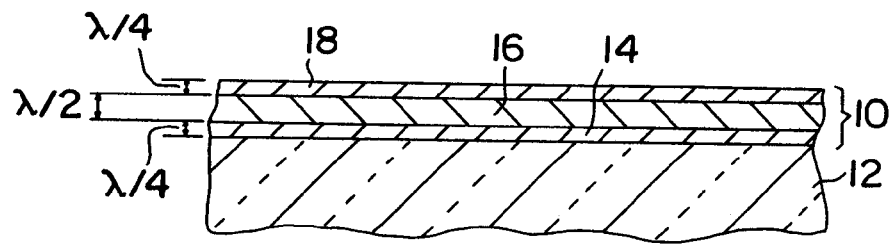
FIG. 2 is an enlarged, partially broken cross-sectional view of a portion of the three-layer multilayer antireflection coating of FIG. 1.

Referring now to the drawings in detail, there is shown in FIGS. 1 and 2 a coated inorganic substrate 12 having a multilayer antireflection coating in accordance with one preferred embodiment of the present invention, generally designated as 10. The antireflection coating 10 is applied to a substrate 12 which is preferably inorganic. The substrate is preferably formed of a glass which can later be subjected to a heat treatment such as tempering. However, it will be understood, based on this disclosure, that the coating may be applied to other inorganic substrates such as silica, ceramics and the like which require optical coatings and which are later subjected to heat treatment. While other inorganic substrates may be used, the invention as described further below will be generally described with respect to the preferred embodiment including a glass substrate. Glasses which are preferably used with and in the invention include ordinary window glass such as ⅛" or ¼" ordinary window glass or float glass, or borosilicate glasses, glass ceramics and absorbing glasses. Absorbing glasses include commercial glasses such as 70% transmission glass like Solargray (available from PPG Industries) or Solarbronze (available from PPG Industries), 50% transmission glass, 31% transmission privacy glass like Graylite (available from PPG Industries) in color gray and 70% transmission privacy glass in color bronze.

One of the advantages of the present invention is that the coatings may be applied to any size substrate, small or large, flat or shaped as well as to the outside or inside of tubes or both. Thus the coatings may be applied to large, un-cut pieces of glass for quick processing by dip coating techniques, and later cut and/or trimmed for further heat treatment and/or tempering. Preferably, for forming tempered glass, the coatings are applied to as large a piece of un-cut glass as possible to contribute to the efficiency of the process.

The coatings are applied using dip coating or similar sol-gel techniques and are preferably in a bilayer or multilayer design, preferably of three or four layers. However, it should be understood, based on this disclosure that additional layers may be provided for different applications. Two, three and four layer antireflection coatings formed by dip coating using other material combinations are known and are described, for example, in H. A. Macleod, "Thin Film Optical Filters," Adam Hilger, Ltd., Bristol 1985. The coatings are designed to provide specific indices of refraction for different applications to deliver required optical properties. Indices of refraction are material constants. The index of refraction of a material, the amounts of a material, the combinations of materials and layer thicknesses all affect the optical properties of the resulting system. Bilayer coatings generally have an M/L design which includes an inner layer of a material having a middle level index of refraction (M layer) and a layer of a material of a low level index of refraction (L layer) as an outer layer. Such designs are useful, for example, with laser optic applications. Four layer systems generally have a H/L/H/L design and include an inner layer formed of a material of a high level index of refraction (H layer) coated by a material of a low index of refraction (L layer) followed by a further H layer and L layer. Four layer coatings may be used for technical applications which need to accommodate a somewhat greater amount of light passing through the coating then for standard applications. The coatings according to the present invention having M/L and H/L/H/L designs include materials as set forth below which, unexpectedly, allow for substantial retention of optical properties upon heat treatment.

In one embodiment, the multilayer coating is a "three layer low" design having an inner layer of a material of a middle level index of refraction, a middle layer of a high level index of refraction and an outer layer of a material of a low level index of refraction (M/H/L). Such three layer designs are typically used for window glass, picture frames and the like as noted previously herein. As shown in FIG. 2, such a multilayer coating design has three layers, an inner layer 14, a middle layer 16 and an outer layer 18. The inner layer 14 has a middle level index of refraction in a cured coating of from about 1.54 to about 1.90, preferably from about 1.68 to about 1.82, and is preferably applied in a thickness of $\lambda/4$ as measured in a direction transversely across the antireflection coating. If the coating is to have broad band antireflective properties, $\lambda$ is typically 550 nm. However, other values of $\lambda$ are possible if different antireflective optical properties are desired. The middle layer 16 is on the inner layer 14 as shown in FIG. 2. The middle layer preferably has a material of a high level index of refraction of at least about 1.90 after curing and a preferred thickness of $2\times\lambda/4$, i.e., $\lambda/2$. The outer layer 18 on the middle layer 16 as shown in FIG. 2 is preferably a material of low index of refraction of about 1.54 or less after curing and is located on the "air side" of the coating. The outer layer in the three layer low design preferably has a thickness of $\lambda/4$. While the preferred thicknesses of the layers are $\lambda/4$, $\lambda/2$ and $\lambda/4$, respectively, it should be understood by one skilled in the art, that thickness may be varied for modifying or customizing optical properties for various coating applications.

The index of refraction is a known material constant. The index may differ for a given material depending upon crystalline structure or due to modifications to the material. Using sol-gel coating techniques like dip coating, the index of refraction of a specific layer can also be adjusted by having different materials in a single layer as in the present invention. The index as measured in an already applied coating is generally lower than the index of refraction as measured for the bulk material due to imperfections in the network or crystal structure or the level of porosity of the coating. Coatings are typically porous to some extent and the degree of porosity depends on the material being used and the coating technique.

In forming antireflective designs using the layers of the invention, the index of refraction for the specific layers required is adjusted by mixing the materials described below and adjusting the layer thicknesses accordingly. Such mixing techniques are not generally applicable in vacuum coating techniques generally used for forming coatings on substrates. As such, the present invention offers advantages by providing more flexibility in optical design. The specific selection of materials in accordance with this invention assures the ability of the coating to substantially retain optical properties after tempering, or otherwise heat treating the final coating.

Depending upon the reflection color desired, the coatings of the invention may be provided in blue, green, purple or other reflection colors. While reflection of coatings in accordance with the invention typically exhibit very low levels of reflection, for example, less than about 1%, the reflection can be colored as noted above.

The inner layer 14 of the coating is applied such that it is preferably in contact with the substrate 12. However, it will be understood that the substrate may already have one or more layers already applied provided such layers are capable of being heat processed. Examples of standard coatings which may already be on the glass include low E coatings, i.e., low emissivity coatings and/or conductive coatings such as tin oxide and indium tin oxide (ITO) coatings which may or may not be doped. With respect to the coating 10 in FIG. 2, the inner layer 14 of the invention which has a middle level index of refraction (M), includes at least two different metallic oxides which are capable of providing an index of refraction of from about 1.54 to about 1.90, and preferably from about 1.68 to about 1.82 after curing. While more than two oxides may be used, it is preferred that the at least two different oxides include a metallic oxide having a high level index of refraction and a material having a low level index of refraction. Such a mixture of materials provides the desired middle level index of refraction. Preferably one metallic oxide in the inner layer 14 is a low level index of refraction material, for example, an oxide of silicon such as silicon dioxide and/or an aluminum oxide. The high level index of refraction material in the middle layer is preferably a metallic oxide or mixture of oxides such as at least one oxide of titanium, zirconium, lanthanum, tantalum and/or niobium. Preferably, the high level material is zirconium oxide or one of the following combinations: zirconium oxide and niobium oxide; zirconium oxide and lanthanum oxide; zirconium oxide and tantalum oxide; or zirconium oxide and niobium oxide and tantalum oxide.

As such, the inner layer 14, is formed of a mixture of any of the low index materials and high index materials noted above, and most preferably is a mixture of aluminum oxide and zirconium oxide, although it is also preferred to use a mixture r of aluminum oxide and one of the other preferred zirconium oxide combinations noted above. Prior to coating the substrate, the substrate is preferably cleaned by any suitable method known in the art or to be developed. The method of cleaning is not critical. The cleaned substrate, for example, a flat sheet of glass, is then dipped in a solution containing the above mixture of oxides to form an inner layer of a middle index of refraction.

The solution is preferably a solvent based dip-coating solution including at least one alkanol and water. Preferably, stabilizing agents, acids and catalytic active agents are also provided. The oxide networks in the finished coatings are achieved using sol-gel chemistry and through reactions involving the use of preferably commercially available precursors. However, specialty chemical or synthesized precursors may also be used. For example, a zirconium oxide crystalline network structure may be formed by reactions of a precursor such as zirconium alkoxy nitrates or, more preferably, an alkoxy zirconium alkoxide such as tetrabutoxy zirconium. Niobium oxide may be formed by reactions of niobium chlorides or, more preferably, alkoxy niobium chlorides such as diethoxy niobium trichloride or triethoxy niobium dichloride. However, it will be understood, based on this disclosure, that using basic sol-gel chemistry, precursors may be varied to provide the desired end product such as a network of pure zirconium oxide or mixtures of oxides. Preferably, when zirconium oxide formation is intended, chlorine use in the precursor is minimized to avoid unwanted precipitation of zirconium dichloride or, with other networks, to avoid any other unwanted precipitated byproducts in the coating solution, during the coating or in the final layers. Further exemplary precursors include, for formation of an aluminum oxide network, aluminum chloride or, more preferably, aluminum nitrate, and for formation of a silicon oxide network, alkoxysilanes such as tetraethoxysilane. While aluminum chlorides may be used, it is preferred to use aluminum nitrate or aluminum alkoxides in view of the minimizing of chlorides as noted above. Analogous precursor compounds may also used for formation of other metallic oxide crystalline network structures. For example, lanthanum nitrate, tetrabutoxy titanium, aluminum acetyl acetonate and niobium acetate and other suitable alkoxides, nitrates, acetates, and chelates of the desired coating metals as noted above.

In selecting a low index of refraction material for mixture of oxides in the inner layer 14 or in the outer layer 18 as described further below, aluminum precursors are especially preferred because they provide the advantage of extending the life of the coating solution in comparison with typical prior art precursors such as silicon oxide precursors for low index materials. Such property is significant in that it allows for extended usefulness and stability of the coating solutions. Since precursors are expensive raw materials in forming the coating solutions, and the coatings typically require hazardous disposal when no longer useful, prolonging the life of the coating solutions is very beneficial. Prolonged life for coating solutions will decrease overall cost thereby providing a more economical and commercially viable process as well as to decrease the overall environmental impact of the disposal of unused or expired solutions. The life of the coating solutions using the aluminum precursors can be extended for up to six to nine months as opposed to an average of about three months for the life of coating solutions formed using precursors such as tetraethoxysilane.

The precursors are to be provided in dilute form, for example, about 20 g/l, within the solvent matrix. It should be understood that the amount in solution may be varied provided the criteria for dilution are satisfied, i.e., there must be sufficient precursor for providing the desired amount of metallic oxide in the final coating, but the precursor must be sufficiently diluted to keep the precursor molecules separated until the solution is applied to the surface to avoid premature reaction in the coating solution such that the coating and network forming reactions occur principally on the substrate surface after coating. Water provided initially is in small amounts for providing minor amounts of reactive OH groups. The stabilizing agents, for example, acids such as acetic acid, glycols, polyglycols and similar compounds are added in small amounts sufficient to carry out the function of complexing around the precursor molecules to stabilize the precursor molecules in solution, but to avoid reaction with the precursor. If an acid is used, it may also function to catalyze the condensation reactions which occur during the coating process. Such acids may be any standard condensation reaction catalyst acid, such as hydrochloric or nitric acid as well as acetic acid, and are also added in small amounts. The acid is present in a somewhat greater amount if acid is being used both as a stabilizer and a catalyst.

For forming a coating having a two metallic oxide mixture in the inner layer, the solution should have a ratio of molar equivalents of from about 10:90 to about 90:10 of the first metal (for example silicon or aluminum) to the second metal (for example, zirconium) to provide the desired amount of aluminum and zirconium in the finished metallic oxide network in the inner layer 14.

Solvents which may be used include alkanols such as methanol, ethanol, butanol and the like, as well as any other similar solvents which are substantially non-reactive with the precursor but which exhibit rapid evaporation rates. During the dipping and subsequent coating reactions, the solvent evaporates, causing the water, precursor and acid or other catalyst concentration in the solution to rise significantly. Further, atmospheric moisture is absorbed which further enhances the concentration of water in the system and contributes to catalyzing the reaction. The surface area of the solution is expanded as the solution is spread over the substrate surface which enhances evaporation of solvent, increasing this effect and the enhanced probability of reaction of precursor molecules as the proximity and separation of precursor molecules decreases and contact between molecules increases. The water and precursor molecules undergo reaction leaving a network of oxygen and metallic atoms. Drying removes more of the remaining water and solvent.

The substrate is withdrawn from the solution and a thin film remains on both sides of the surface of the substrate. The film begins to thin due to evaporation of solvent. As the solvent evaporates there is a buffer zone of solvent vapor above the surface of the coating film closer to the dipping solution. As the substrate moves away from the dipping solution, the vapor buffer decreases exposing the coating solution to atmospheric moisture and increasing the rate of reaction.

The acids, if present, further catalyze the reactions and, as their concentration increases due to the evaporation of solvent, the pH begins to decrease. The chemical reactions are complex and their mechanisms are not fully understood. However, it is believed that the overall reaction rate is catalyzed by the changing, i.e., increasing, concentrations of components, the evaporation of solvent and the increase in water concentration as described above. The reactions occur in the zone extending longitudinally along the substrate surface as the solvent is at least partially evaporated from the solution.

Once coated and removed from the dipping solution, the substrate is baked at temperatures of from about 120° C. to about 200° C., and preferably from about 120° C. to about 180° C. to at least partially, and preferably to substantially remove the remaining solvent and water from the solution and form the inner layer 14 as a solid film. It is preferred that the temperature for drying be effective, but kept as low as possible. However, it will be understood by one of ordinary skill in the art, that the temperature for drying may vary in some cases depending upon the materials used in the reactive mixture. At this step, the coating may be subjected to a curing or firing in a furnace at temperatures in excess of 200° C. However, such firing is not necessary at this point. Absent such firing, the layer is not fully cured by drying when the middle layer of the material of high index of refraction (H layer) is applied on the inner layer. Without wishing to be bound by theory, it is believed that any remaining—OH groups left in the inner layer 14 will aid in bonding the inner layer 14 with the middle layer 16 being applied to the inner layer.

After the inner layer 14 has been applied, the middle layer 16 (H layer) is coated on the inner layer 14 preferably using a similar dip coating procedure described above. The middle layer 16 includes a material of a high index of refraction of at least about 1.90. Preferably, the high index layer includes an oxide of zirconium, such as zirconium dioxide, however, other high index of refraction materials may be combined with the oxide of zirconium to adjust the index of refraction. The coating solution is formed as noted above using the same type of materials in the above noted amounts, and using the same or similar sol-gel chemistry and reactions, but using precursors which will provide oxides of zirconium, such as a tetrabutoxy zirconium precursor as described above.

Other high index of refraction materials may also be provided to the middle layer to adjust the index of refraction if necessary. Such materials include oxides of lanthanum, tantalum, and niobium and are added to the coating solution using suitable sol-gel precursors as noted above, provided such precursors are selected to avoid potential precipitation of unwanted byproducts as described above. Such materials may raise the index somewhat depending on the characteristics of the materials selected and the molar ratio used. Preferably, from about 50% to about 100%, and more preferably from about 90% to about 100% molar equivalents of zirconium oxide are provided to the middle layer 16 regardless of the addition of other materials.

The substrate 12 is then withdrawn from the solution as described above and a thin film remains on the outer surface of the inner layer 14 on both sides of the coated substrate. After evaporation and reaction, a coating is formed having a network of zirconium oxide or a combination of zirconium oxide and other oxides, preferably at least one of lanthanum, tantalum, niobium, or silicon.

Once coated and removed from the dipping solution, the substrate is again baked at temperatures of from about 120° C. to about 200° C., and preferably from about 120° C. to about 180° C. to preferably substantially remove remaining solvent and water from the solution and form the middle layer 16 as a solid film. While the coating can be subjected to firing in excess of 200° C. for fully curing the coating, such firing is not necessary at this point. Without wishing to be bound by theory, it is believed that some reactive—OH sites preferably remain for aiding in bonding the middle layer 16 to the overlying outer layer 18. Absent additional firing as noted above, the layer 16 is not fully cured and the outer layer 18 of the material of low index of refraction (L layer) is applied on the middle layer 16. As noted above, it is believed that any remaining—OH groups left in the middle layer 16 will aid in bonding with the outer layer being applied to the middle layer.

After the middle layer 16 has been applied, the outer layer 18 (L layer) is coated on the middle layer 16 preferably using a similar dip coating procedure described above. The outer layer 18 includes a material of a low index of refraction of preferably about 1.54 or less. Preferably, the low index layer includes at least one oxide of a low index of refraction such as oxides of aluminum and of silicon. Oxides of zirconium may also be combined in this layer provided the mixture of oxides provides the desired low index of refraction. Preferably, the outer layer is a mixture of the oxides of silicon and aluminum. As noted above, the aluminum oxides provide significant improvement in coating solution stability such that they are preferred low index materials in the invention. Preferably the precursor is an aluminum nitrate, although other suitable aluminum precursors may be used. A suitable silicon precursor may be any silicon sol gel precursor, preferably tetraethoxysilane. The zirconium precursor, if zirconium is further provided in a mixture of low index oxides, may be the zirconium precursors as described above. The coating solution is also formed as noted above with respect to the inner and middle layers 14, 16 using the same type of reaction components in the above noted amounts but with the preferred low index precursors for the outer layer 18, and using the same or similar sol-gel chemistry and reactions.

The oxides may be used in various combinations provided to adjust the index of refraction of the outer layer 18. Materials which may raise the index somewhat can also be provided, such as those noted above, if the index is sufficiently low and the intention is to slightly raise the index. Such adjustments are known in the art and will depend on the characteristics of the materials selected and the molar ratio used. While aluminum oxide or silicon oxide may be used alternatively, if used in combination, preferably, from about 5% to about 50% molar equivalents of aluminum oxide and from about 50% to about 95% molar equivalents of silicon oxide are provided to the outer layer 18 regardless of the addition of other materials, such as zirconium and the like.

The substrate 12 is then withdrawn from the solution as described above and a thin film remains on the outer surface of the middle layer 16 on both sides of the coated substrate. After evaporation and reaction, a coating is formed having a network of oxygen atoms and silicon, aluminum and/or zirconium or any other oxides provided for adjusting the index of refraction of the outer layer 18 to be about 1.54 or less.

Once coated and removed from the dipping solution, the substrate is again baked at temperatures of from about 120° C. to about 200° C., preferably from about 120° C. to about 180° C. to preferably substantially remove remaining solvent and water from the solution and form the outer layer 18 as a solid film. At this point, the layer is not fully cured, but is further heat treated.

After all three layers have been applied and subjected to intermediate drying, the entire coating is then finally heat treated by firing the multilayer coating at higher temperatures, preferably from about 300° C. to about 450° C. However, it should be understood that these temperatures may be adjusted somewhat for different coating materials or material combinations used. The final firing completes formation of the network forming reactions which occur in the layers such that the remaining solvent, water and active—OH groups are substantially removed in favor of—O—link bridges in the network structure. The firing may also contribute to completion of the crystallization process occurring within the coating layers. The final coating, after firing is dense and stable. The multilayer antireflection coating 10 is preferably of a total thickness measured in a direction transverse to the substrate surface of from about 100 nm to about 400 nm, more preferably from about 190 nm to about 300 nm, depending upon the optical system desired. Preferably, the coatings substantially retain their optical qualities after any subsequent heat treatment after firing, i.e., the index of refraction, wherein the coating thickness preferably varies no greater than about ±5 nm, more preferably no greater than about ±3 nm and preferably undergoes no change at all after the coating is formed and subjected to any subsequent heat treatment of the substrate, such as tempering of glass. Examples of the ability of the multilayer coatings to substantially retain optical properties after heat treatment may be found in the optical curve data provided below in Example 4. The use of the zirconium-based precursors and the inclusion of the zirconium oxide network in the antireflection coatings as described herein unexpectedly, and substantially contributes to the capability to retain optical properties as described herein. Further, the use of aluminum-based precursors and the inclusion of the aluminum oxides in the layers of the coatings as a low index material provides enhanced stability of the precursor solutions and further contributes to the economic and commercial feasibility of formation of such coatings for use in large scale production of heat treated inorganic substrates such as tempered glass.

The coated inorganic substrate, which is preferably formed on a large substrate for economical reasons, but which may also be formed on smaller substrates, can now be cut, trimmed or shaped as desired and the coated substrate may be further heat treated and still substantially retain its optical properties. Other uses and applications for the coatings of the invention include use in bending or forming glass without significantly changing the optical properties of the coating, for example, antireflective coated glass may be bent to the shape of a computer monitor or television screen to form the front surfaces which are later glued onto the screens. In addition, the coatings may be used in any application where the coated glass will be exposed to high temperature processing such as formation of optical coatings that allow only light of specific wavelengths to pass through while blocking other wavelengths including cut-off filters, color conversion filters, color filters such as those used in the film industry as special effect light filters or in laser applications. If the substrate or the coating have some absorption, the substrate will heat up during use, especially if the light source used is a high-energy light source such as a laser. With conventional coatings, such heat and/or high-energy light exposure will shift the optical system properties. However, coatings according to the invention will undergo little, and preferably no shift in optical properties.

Preferably, if a glass substrate is used, such as the glass substrates noted above, and is to be formed into safety glass in accordance with the preferred embodiment of the invention, the glass substrate is coated as noted above, and then subjected to a tempering process. Tempering may be conducted in accordance with any known tempering method or by any tempering method to be later developed. The technique for tempering is not critical to the invention. However, it should be noted that the tempering procedure to achieve safety glass standards must be conducted at temperatures sufficient to induce the requisite stress in the glass. The tempered safety glass has numerous practical applications including safety glass for automobiles and other vehicles, picture frames, display cases and computer screens. Typically tempering is performed in accordance with ASTM-C-1048-97b which provides the standard specification for Heat-Treated Flat Glass-Kind HS, Kind FT Coated And Uncoated Glass, although similar procedures known in the art or to be developed may also be used.

The invention also includes an inorganic coated substrate 12 coated with the multilayer coating 10 having an M/H/L design as described in detail above and as shown in FIGS. 1 and 2. The coated substrate may be any of the substrates noted above which are preferred for use with the multilayer antireflection coating. Preferably, the coating substantially retains its optical properties when the inorganic substrate is glass and the coated glass is subjected to tempering as described above.

Figure 3:
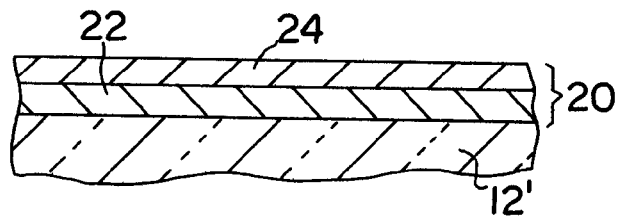
FIG. 3 is an enlarged, partially broken cross-sectional view of a portion of a bilayer antireflection coating formed in accordance with an embodiment of the invention.

As noted above, bilayer coatings and multilayer coatings having four or more layers are also within the scope of the invention. With respect to the bilayer antireflection coating 20, as shown in FIG. 3, the coating has an inner layer 22 having a middle index of refraction and may be formed in the same manner and, preferably, using the same materials and procedures as described above with respect to the inner layer 14 in the M/H/L multilayer antireflection coating 10. As such, the inner layer 22 in the bilayer coating 20 is an M layer which is intended for contacting an inorganic substrate 12'. Preferably, the substrates are glass. The inner layer 22 preferably comprises an oxide of zirconium and at least one oxide of a metal different from zirconium such that the index of refraction of the inner layer 22 is from about 1.54 to about 1.90 and preferably from about 1.68 to about 1.82 after curing in a manner as described above with respect to the inner layer 14.

The outer layer 24 of the bilayer antireflection coating 20 preferably includes a material having a low index of refraction, an L layer. The outer layer 24 is preferably formed on the inner layer using the same sol-gel chemistry and coating techniques described above and as used for the inner layer 22. The outer layer 24 may include any of the same materials noted above with respect to the outer layer 18 of the multilayer antireflection coating 10. The bilayer antireflection coating 20 having an M/L design and inorganic substrate 12' coated with such bilayer antireflection coating 20 according to the invention are preferably formed, and may be heat treated by any of the techniques described above with respect to the multilayer antireflection coating 10.

Figure 4:
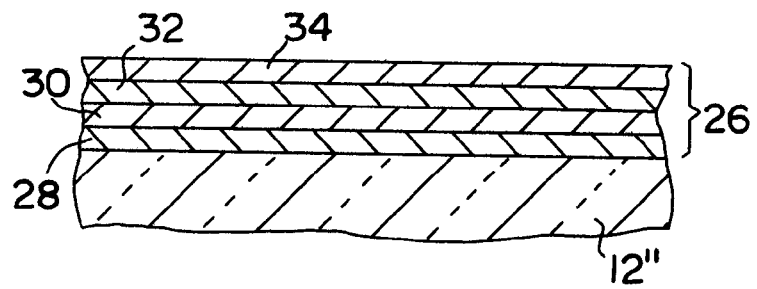
FIG. 4 is an enlarged, partially broken cross-sectional view of a portion of a four-layer multilayer antireflection coating formed in accordance with one embodiment of the invention.

Formation of a multilayer antireflection coating 26 as shown in FIG. 4 having four layers is preferably formed in an H/L/H/L design, that is, an inner layer 28 is formed for contact with an inorganic substrate 12". The substrate for use with such layers, preferably for technical applications which are intended to allow more light to pass through, such as those described in H. K. Pulker, *Coatings On Glass* (Elsevier Publishing) 1984 and may be the substrates as described above. Preferably, the substrate 12" is glass. The inner layer 28 is a layer having a high index of refraction, an H layer, and may be formed of the same materials and using the same techniques as the middle layer 16 in the multilayer coating 10 described above. Preferably, the inner layer 28 includes at least one oxide which is an oxide of zirconium and has an index of refraction of at least about 1.90 after curing.

A first middle layer 30 is formed on the inner layer 28 and is preferably a layer of a low index of refraction of 1.54 or less after curing. The first middle layer 30 may be formed of any of the materials and using the techniques described above with respect to the outer layer 18 in the multilayer antireflection coating 10.

A second middle layer 32 which is preferably the same as the inner layer 28 is formed on the first middle layer 30 such that the second middle layer 32 is also a layer of a high index of refraction. It should be understood, based on this disclosure, that the oxides provided to the inner layer 28 and the second middle layer 32 may vary and may be adjusted with different materials, provided the index of refraction is at an acceptably high level.

An outer layer 34 is formed on the second middle layer 32. The outer layer 34 is a layer of a low index of refraction, an L layer, and is preferably the same as the first middle layer 30 noted above. However, as noted above with respect to layers 28 and 32, the outer layer 34 and the first middle layer 30 may have different materials provided they both achieve an acceptably low index of refraction of preferably about 1.54 or less. The present invention includes an antireflection coated inorganic substrate which includes an inorganic substrate 12" coated with the multilayer antireflection coating 26 as described herein.

The method of the present invention includes a method for making a heat treated antireflective coated inorganic substrate. The method includes coating an inorganic substrate, such as the substrates described above, with an inner layer of a middle index of refraction such as those described above with respect to the inner layer 14 in the multilayer antireflection coating 10. A middle layer, such as the middle layer 16 of a high index of refraction is coated on the inner layer 14. An outer layer 18 of a low index of refraction is coated on the middle layer 16. The layers as coated on the inorganic substrate 12 are then heat treated. This same method, within the scope of the invention may include coating for formation of a bilayer and multilayer coating of four or more layers. The layers in the method of the invention are preferably all coated on the substrate and each other using the sol-gel chemistry and dipping techniques described in detail above. The heat treatment may be any of those mentioned with respect to the antireflection coating 10.

The invention will now be described based on the following non-limiting examples:

EXAMPLE 1

An M-layer solution was formed by combining 500 ml of 95% ethanol and 80 ml of tetrabutoxy zirconium by mixing in a beaker while stirring. To the mixture, 50 ml of acetic acid were added with continuous stirring for four hours at room temperature. After four hours, 90 g of aluminum nitrate (Al(NO$_3$)$_3$ ·9H$_2$O) were dissolved in 100 ml of ethanol and were added to the solution of tetrabutoxy zirconium, ethanol and acetic acid. The solution was stirred for another 24 hours at room temperature and than ethanol was added to the solution until a total volume of 1 liter was reached. The solution was used to form a coating having a refractive index of 1.76.

EXAMPLE 2

An H-layer solution was formed by mixing 500 ml of 95% ethanol and 180 ml of tetrabutoxy zirconium in a beaker while stirring at room temperature. To this mixture, 50 ml acetic acid were added. The mixture was stirred for four hours at room temperature and then ethanol was added to the solution until a volume of 1 liter was reached. The solution formed a coating having an index of refraction of 1.95.

EXAMPLE 3

An L-layer solution was formed by mixing 160 ml of ethanol, 93 ml of tetraethoxysilane, 54 ml of DI water and 1 ml of HCl (35%) at room temperature while stirring. During stirring at room temperature, the viscosity was measured every hour. When the viscosity reached a value of 3.0–3.2 centistokes, a second solution of 2 g of aluminum nitrate (Al(NO$_3$)$_3$·9H$_2$O dissolved in 50 ml of ethanol was added to the solution of tetraethoxysilane, DI water and HCl. Both solutions were then mixed well and ethanol was added to the solution until a total volume of 1 liter was reached. The solution formed a coating having an index of refraction of 1.46.

EXAMPLE 4

Figure 5:
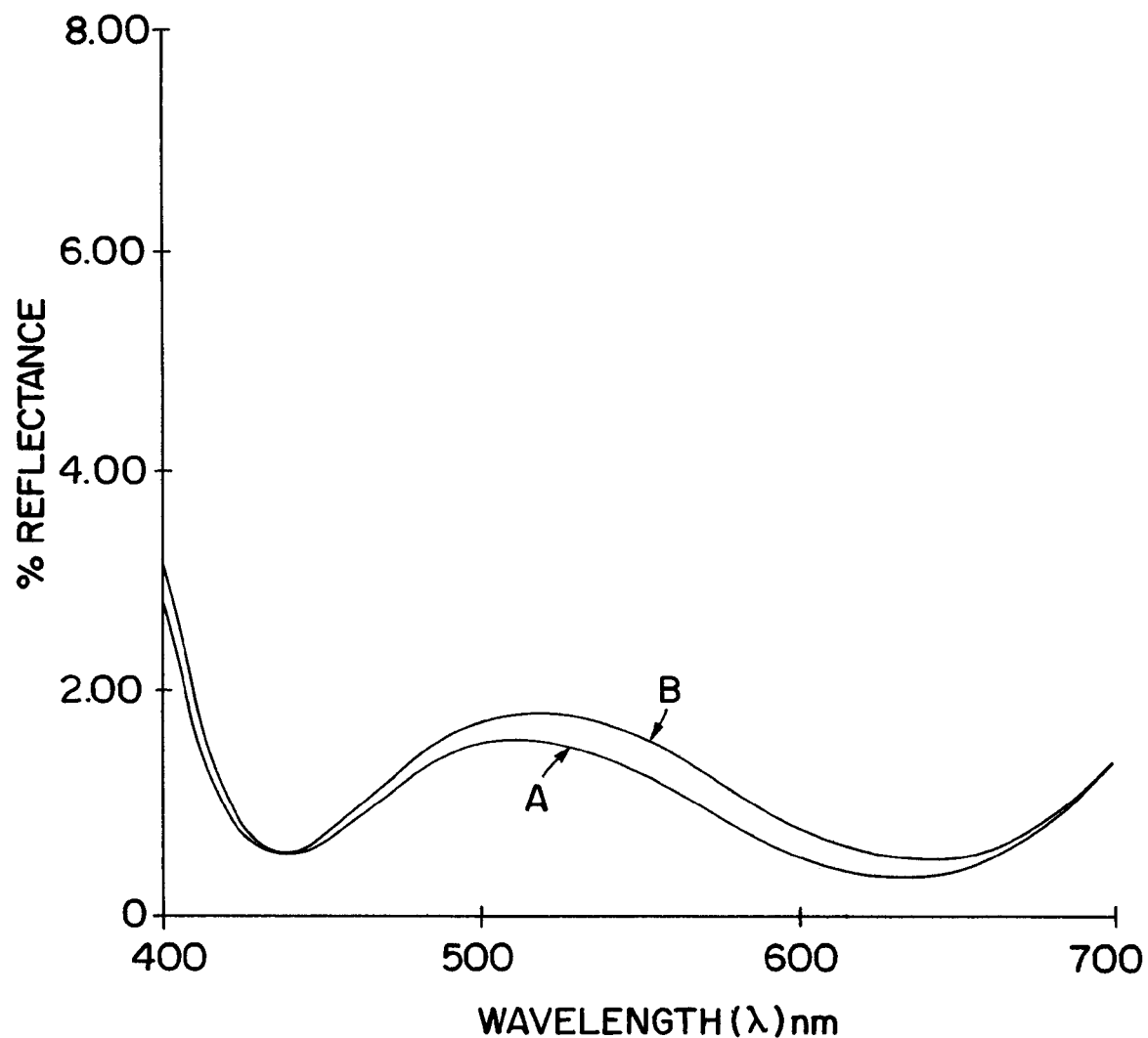
FIG. 5 is a graphical representation of the effect of tempering on a multilayer antireflection coating formed in accordance with Example 4.

A piece of float-glass having a thickness of 3 mm and a size of 44 in. (111.76 cm)×66 in. (162.56 cm) was cleaned. The glass was dipped in an M-solution made in accordance with Example 1 and was withdrawn vertically from that solution at a rate of 6 mm/s. After removing the glass it was dried in an oven at 150° C. for 5 minutes. After allowing the glass to cool to room temperature, it was dipped into an H-layer solution formed in accordance with Example 2 and withdrawn vertically from that solution at a rate of 8 mm/s. The glass was then dried again in an oven at 150° C. for 5 minutes. The glass was allowed to cool to room temperature and was then dipped into an L-layer solution formed in accordance with Example 3 and withdrawn vertically at a rate of 8 mm/s. The percent reflectance was measured at 10 nm intervals from 400 nm to 690 nm and the data are as shown below in Table 1 and as represented graphically in FIG. 5. In FIG. 5, curve A represents the desired target value to be achieved and is measured before tempering the coated glass. Curve B in FIG. 5 represents the percentage reflectance after tempering. As can be seen in FIG. 5 there is little shift in the curve before and after tempering and optical quality is retained. TABLE 1

TABLE 1

|  | % Reflectance | |
| --- | --- | --- |
| Wavelength (nm) | Before (A) | After (B) |
| 410 | 1.87 | 1.64 |
| 420 | 1.05 | 0.94 |
| 430 | 0.65 | 0.62 |
| 440 | 0.56 | 0.58 |
| 450 | 0.67 | 0.72 |

TABLE 1-continued

|  | % Reflectance | |
| --- | --- | --- |
| Wavelength (nm) | Before (A) | After (B) |
| 460 | 0.89 | 0.96 |
| 470 | 1.09 | 1.19 |
| 480 | 1.29 | 1.42 |
| 490 | 1.45 | 1.60 |
| 500 | 1.55 | 1.73 |
| 510 | 1.57 | 1.79 |
| 520 | 1.54 | 1.79 |
| 530 | 1.49 | 1.76 |
| 540 | 1.41 | 1.70 |
| 550 | 1.29 | 1.60 |
| 560 | 1.15 | 1.47 |
| 570 | 0.98 | 1.30 |
| 580 | 0.81 | 1.11 |
| 590 | 0.66 | 0.93 |
| 600 | 0.53 | 0.78 |
| 610 | 0.44 | 0.67 |
| 620 | 0.39 | 0.60 |
| 630 | 0.37 | 0.54 |
| 640 | 0.38 | 0.52 |
| 650 | 0.43 | 0.54 |
| 660 | 0.52 | 0.60 |
| 670 | 0.66 | 0.72 |
| 680 | 0.85 | 0.89 |
| 690 | 1.09 | 1.11 |

As can be seen from the above data, while various three layer low, bilayer and four layer design coatings, as well as higher numbers of layers of coatings are available in the art, the particular systems and techniques of the present invention provide unique stability and substantially retain optical properties after heat treatments such as tempering. The claimed invention further is economical and easy to use for large scale production of antireflective coated substrates using large sized substrates due to the ability to dip coat the substrate prior to cutting and tempering. The invention further does not require expensive equipment and techniques such as sputtering. Therefore, the antireflection coatings, antireflection coated inorganic substrates and the method of the invention satisfy a need in the art for economical formation of antireflection coated substrates which may be large in size, without the need for expensive procedures and allowing cutting and trimming after coating while substantially maintaining optical properties. The coatings of the invention as formed by the method of the invention are of optical quality and show substantial uniformity and durability. They are very heat stable and substantially retain their optical properties and achieve optical quality even after heat treatments such as tempering processes for forming safety glass.

It will be appreciated by those skilled in the art that changes could be made to the embodiments described above, including providing additional coating layers above or below the multilayer coating of the invention, without departing from the broad inventive concept thereof. It is understood, therefore, that this invention is not limited to the particular embodiments disclosed, but it is intended to cover modifications within the spirit and scope of the present invention as defined by the appended claims.

We claim:

1. A sol-gel derived multilayer antireflection coating for use in coating a heat treatable inorganic substrate comprising:
   (a) an inner layer for contact with an inorganic substrate having at least two different metallic oxides and which provides an index of refraction of from about 1.54 to about 1.90 after curing;

(b) a middle layer on the inner layer comprising an oxide of zirconium and which provides an index of refraction of at least about 1.90 after curing; and (c) an outer layer on the middle layer comprising at least one metallic oxide and which provides an index of refraction of about 1.54 or less after curing and wherein optical properties of the sol-gel derived multilayer antireflection coating are substantially retained after the multilayer antireflection coating is applied to an inorganic substrate and subsequently subjected to a heat treatment.

2. An inorganic coated substrate coated with the multilayer antireflection coating according to claim 1.

3. The multilayer antireflection coating according to claim 1, wherein the multilayer antireflection coating substantially retains optical properties when applied to glass and subsequently subjected to tempering.

4. The multilayer antireflection coating according to claim 1, wherein the inner layer provides an index of refraction of about 1.68 to about 1.82 after curing.

5. The multilayer antireflection coating according to claim 1, wherein the inner layer has at least one oxide of at least one metal selected from the group consisting of titanium, zirconium, lanthanum, tantalum, and niobium and at least one second oxide of at least one metal selected from the group consisting of silicon, and aluminum.

6. The multilayer antireflection coating according to claim 5, wherein the inner layer comprises the oxides of zirconium and aluminum.

7. The multilayer antireflection coating according to claim 1, wherein the middle layer further comprises an oxide of a metal selected from the group consisting of lanthanum, tantalum, niobium, and silicon.

8. The multilayer antireflection coating according to claim 7, wherein the middle layer comprises a mixture of the oxides of zirconium and niobium.

9. The multilayer antireflection coating according to claim 7, wherein the middle layer is a mixture of the oxides of zirconium and silicon.

10. The multilayer antireflection coating according to claim 1, wherein the outer layer comprises at least one oxide of at least one metal selected from the group consisting of zirconium, silicon, and aluminum.

11. The multilayer antireflection coating according to claim 10, wherein the outer layer is a mixture of the oxides of silicon and aluminum.

12. The multilayer antireflection coating according to claim 1, wherein the inner layer has a thickness of $\lambda/4$, the middle layer has a thickness of $\lambda/2$ and the outer layer has a thickness of $\lambda/4$, wherein the thicknesses are measured transversely across the coating.

13. The multilayer antireflection coating according to claim 1, wherein a thickness of the multilayer coating as measured transversely across the coating is from about 100 nm to about 400 nm.

14. The multilayer antireflection coating according to claim 1, wherein the coating is of optical quality and has a thickness variation of no greater than 2 nm after application to a glass substrate and subsequent tempering.

15. A sol-gel derived multilayer antireflection coating for use in coating a heat treatable inorganic substrate comprising:

(a) an inner layer comprising an oxide of zirconium and which provides an index of refraction of at least about 1.90 after curing;

(b) a first middle layer on the inner layer having at least one metallic oxide and which provides an index of refraction of about 1.54 or less after curing;

(c) a second middle layer on the first middle layer comprising an oxide of zirconium and which provides an index of refraction of at least 1.90 after curing; and (d) an outer layer on the second middle layer having at least one metallic oxide and which provides an index of refraction of about 1.54 or less after curing, wherein optical properties of the sol-gel derived multilayer antireflection coating are substantially retained after the multilayer antireflection coating is applied to an inorganic substrate and subsequently subjected to a heat treatment.

16. An antireflective coated inorganic substrate coated with the multilayer antireflective coating according to claim 15.

* * * * *